March 29, 1949.    H. O. OTTERNESS    2,465,551
WHEEL ANCHOR
Filed March 13, 1947
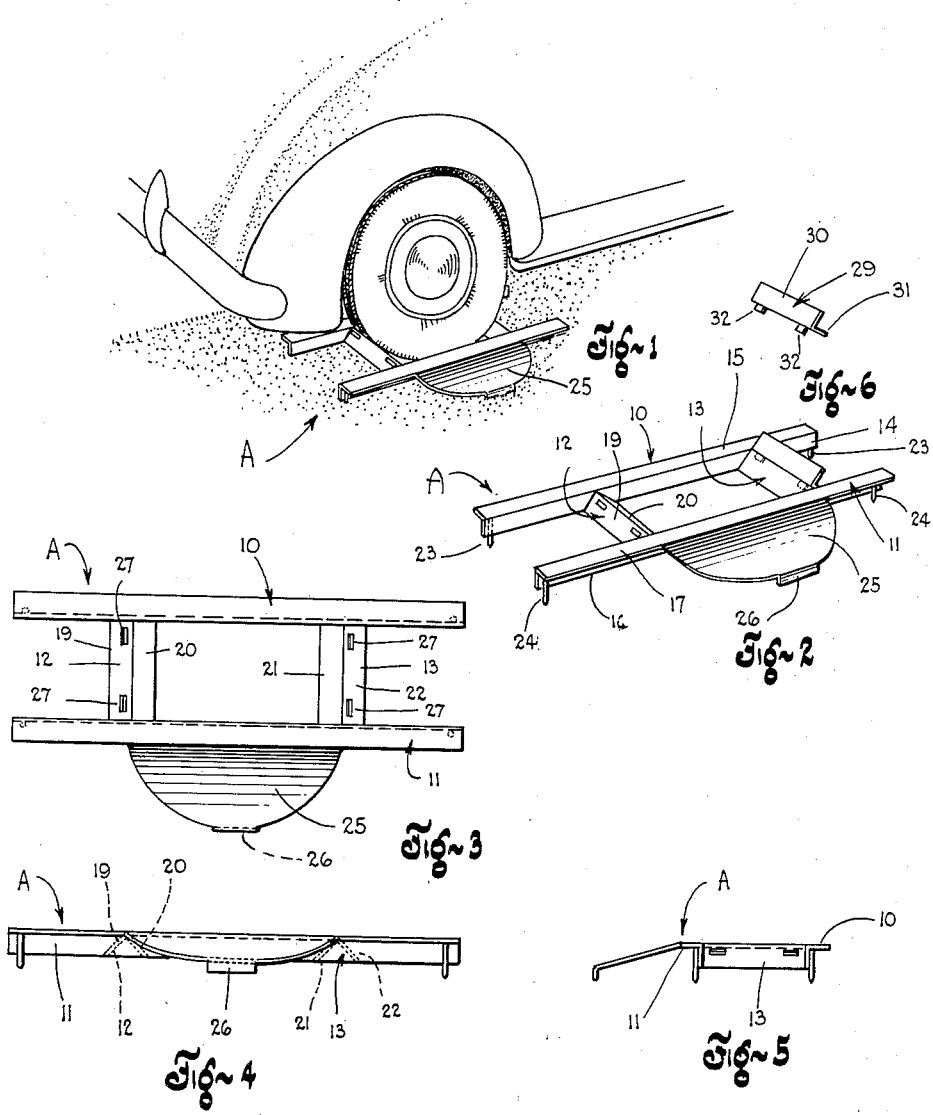
Inventor
Harold O. Otterness
By Robert M. Dunning
Attorney Patented Mar. 29, 1949

2,465,551

UNITED STATES PATENT OFFICE 2,465,551

WHEEL ANCHOR

Harold O. Otterness, Kasson, Minn.

Application March 13, 1947, Serial No. 734,463

7 Claims. (Cl. 188—32)

My invention relates to an improvement in wheel anchor wherein it is desired to provide a means of holding a car stationary.

During the past few years the use of bumper jacks has become more popular. These jacks have one particular disadvantage over jacks of other types used for lifting the wheels of vehicles. Because of the springs between the car body and the wheels of the vehicle, it is necessary to lift the car body to a considerable height in order to elevate the wheel the necessary amount. As a result a considerable force is often produced, tending to move the car in one direction or another. If the car is on wet or icy pavement, the elevation of one portion of the body will often slide the car, thus causing the same to be tilted from the jack. As a result the danger of accidents while changing tires is considerably increased when jacks of this type are employed.

It is the object of the present invention to provide a means of holding the car from movement while one wheel thereof is being lifted. By use of this device the car is firmly anchored in place and will not move even though a considerable strain tending to slide or move the car is exerted thereagainst.

A feature of the present invention lies in the provision of a means which is capable of preventing the car from sliding either in a lateral or in a longitudinal direction. My device includes a frame into which one of the wheels of the car may be engaged. This frame is engageable with the tire upon movement of the tire forwardly, rearwardly, or sideways, thereby anchoring the wheel from movement in any direction.

A feature of the present invention lies in the provision of a frame construction which includes a series of vertical flanges on which the frame rests. These flanges are usually pressed against or into the surface of the road by the weight of the car entering the frame, and the frame is thus securely held from movement.

An added feature of the present invention lies in the provision of a frame having a pair of spaced sides and a pair of spaced connecting angle members. These angle members are secured between the spaced sides with the apex between the flanges of the angle member uppermost. As a result the wheel may roll easily over one of these angle members in entering or leaving the frame. As the ends of the side members project substantially beyond the transverse connecting members, the frame can not tilt while the vehicle passes over the same.

An added feature of the present invention lies in the provision of a side plate which may be secured if desired to one of the side frame members to extend a substantial distance from this side member. This additional laterally projecting member acts to prevent tilting of the frame when the frame is used on a slope such as may be found at the side of the road or on a highway shoulder.

An additional feature of the present invention lies in the provision of a means whereby the height of the frame portions may be increased when necessary. If the car is positioned on a steep incline when the wheel is anchored, a means may be applied to one of the frame cross members to increase the effective height thereof.

These and other objects and novel features of my invention will be more clearly and fully set forth in the following specification and claims.

In the drawings forming a part of my specification:

Figure 1 is a perspective view of my wheel anchor in place upon a vehicle.

Figure 2 is a perspective view of the wheel anchor in readiness for use.

Figure 3 is a top plan view of the wheel anchor.

Figure 4 is a side elevational view of the wheel anchor.

Figure 5 is an end elevation view of the same.

Figure 6 is a perspective view of the attachment which may be employed to increase the height of one of the cross members when desired.

The wheel anchor A includes a pair of spaced angle members 10 and 11 which are held in proper spaced relationship by a pair of angularly shaped cross connecting members 12 and 13. The side 10 is arranged with one flange 14 extending vertically and the other flange 15 extending horizontally from the upper edge of the flange 14. The side 11 is similarly arranged with one flange 16 extending vertically and the other flange 17 extending horizontally from the upper edge of the flange 16. The vertical flanges 14 and 16 are arranged along the innermost sides of the side members so that the top flanges 15 and 17 extend outwardly therefrom.

The angle members 12 and 13 which form cross connections between the sides 10 and 11 are secured to the side members at points spaced from the ends thereof. The connecting member 14 includes two flanges 19 and 20 arranged in angular relation with the apex of the connection uppermost and with the lower edges of these flanges substantially flush with the lower edge of the vertical flanges 14 and 16. The cross connecting member 13 is similarly formed of two right angularly arranged flanges 21 and 22 with the apex therebetween directed upwardly, the free edges of the flanges substantially flush with the lower edges of the vertical flanges 14 and 16. The cross connecting members are welded or otherwise affixed to the side members 10 and 11.

If desired, calks or pins 23 may be secured to the vertical flange 14 of the side member 10 near the opposite ends thereof. These calks 23 and 24 may be pointed at their lower extremity and project below the level of the flanges 14 and 16. These calks are particularly useful in icy weather as they extend into the ice and firmly anchor the frame in place. The calks also extend into the dirt or ground of the usual highway shoulder to hold the frame in place. Where the frame is to be used entirely on pavement, the calks may be omitted as it is desirable that the lower edges of the vertical flanges engage the surface on which the frame is positioned.

An arm or apron 25 is secured to one of the side members such as 11 and extends laterally from the frame a substantial distance. The vertical flange 26 is usually provided on the apron 25 near the outer extremity therof. The apron 25 preferably slopes downwardly somewhat from the upper surface of the side frame member 11 so as to extend to a point substantially flush with the under-surface of the side frame members. The flange 26 may extend downwardly from this point where the frame is provided with calks 23 and 24 and the frame is designed for general use if the frame is to be used solely on pavement or on extremely hard surfaces. The lower edge of the flange 26 may be on the same plane as the lower surfaces of the vertical flanges 14 and 16.

Each of the cross members 12 and 13 may if desired be provided with a pair of spaced slots 27 therein in one flange thereof. The slots 27 are provided in the outermost flanges 19 and 22 of these cross members. An angle member 29 is provided which may be attached to either of the cross members 12 and 13 as indicated in Figure 2 of the drawings. The angle member 29 is provided with a flange 30 which may form a continuation of the inner flange 20 or 21 of the cross members and the member 29 is also provided with a flange 31 which may lie in parallel adjacent relation to the outer flanges 19 or 22. Spaced lugs 32 are provided on the undersurface of the flange 31 which are engageable in the slots 27 to hold the angle member 29 in proper position.

It will be noted that when the angle member 29 is in place, the effective height of one of the cross members is increased. This attachment is desirable if the frame is employed on a steep grade. Ordinarily, however, the cross members 12 and 13 are of sufficient height to prevent the car from moving forwardly.

In operation the frame is set either forwardly or rearwardly of one of the wheels of the vehicle, usually opposite the wheel to be elevated. The car is then driven forwardly or rearwardly until the wheel engages between the cross members 12 and 13. These cross members are of sufficient height so that the driver will readily recognize when the car is in place upon the frame. The movement of the car over one of the cross members will cause the frame to be forced into the surface on which it rests, easily holding the wheel from movement in any direction. When the wheel anchor is no longer required, the car may be driven off of the anchor.

From the foregoing description it will be seen that my wheel anchor has four major advantages over the usual devices used for this purpose. In the first place my apparatus is self-aligning as the sides 10 and 11 will engage on opposite sides of the wheel and the anchor will be held in alignment with the wheel thereby as the wheel travels over the same. In the second place my apparatus is non-tilting and can not tilt upwardly while the wheel is traveling over the same. Because of the structure which I use my device is non-skidding and will not move from the position in which it is placed. Finally my wheel anchor provides a positive anchor to prevent the wheel from moving either forwardly, rearwardly, or to either side.

In accordance with the patent statutes, I have described the principles of construction and operation of my wheel anchor, and while I have endeavored to set forth the best embodiment thereof, I desire to have it understood that obvious changes may be made within the scope of the following claims without departing from the spirit of my invention.

I claim:

1. A wheel anchor including a pair of side frame members having vertical flanges designed to engage a supporting surface in edge contact, a pair of cross connecting members connecting said side frame member, said connecting members being spaced sufficiently to allow a wheel to extend therebetween.

2. A wheel anchor including a pair of substantially parallel side members which are angular in cross section with a vertical flange in edge contact with the ground, and a pair of angularly shaped cross connecting members arranged with the apex of the angle members uppermost.

3. A wheel anchor including a pair of side frame members of angular cross section, each side frame member being formed of two angularly arranged flanges, one flange of each side frame member being parallel to a corresponding flange of the other frame member, and the remaining flanges being in substantially co-planar relation, and a pair of cross connecting members, said cross connecting members being angular in cross section and composed of two connecting flanges with the apex therebetween secured uppermost.

4. A wheel anchor including a pair of side frame members of angular cross section, each side frame member being formed of two angularly arranged flanges, one flange of each side frame member being parallel to a corresponding flange of the other frame member, and the remaining flanges being in substantially co-planar relation, a pair of cross connecting members, said cross connecting members being angular in cross section and composed of two connecting flanges with the apex therebetween secured uppermost, a laterally extending flange on one of said side frame members, and a vertical flange at the extremity of said lateral flange.

5. A wheel anchor including a pair of side frame members of angular cross section, each side frame member being formed of two angularly arranged flanges, one flange of each side frame member being parallel to a corresponding flange of the other frame member, and the remaining flanges being in substantially co-planar relation a pair of cross connecting members, said cross connecting members being angular in cross section and composed of two connecting flanges with the apex therebetween secured uppermost, and calk means secured to said parallel flanges and extending below the level of the same.

6. A wheel anchor including a pair of side frame members of angular cross section, each side frame member being formed of two angularly arranged flanges, one flange of each side frame member being parallel to a corresponding flange of the other frame member, and the remaining flanges being in substantially co-planar relation a pair of cross connecting members, said cross connecting members being angular in cross section and composed of two connecting flanges with the apex therebetween secured uppermost, and a detachable angle member detachably connected to either of said cross connecting members to increase the height thereof.

7. A wheel anchor including a pair of side frame members of angular cross section, each side frame member being formed of two angularly arranged flanges, one flange of each side frame member being parallel to a corresponding flange of the other frame member, and the remaining flanges being in substantially co-planar relation, a pair of cross connecting members, said cross connecting members being angular in cross section and composed of two connecting flanges with the apex therebetween secured uppermost, and an angle member detachably connected to one of said cross connecting members, said angle member having one flange in face contacting relation with a flange of the cross connecting member, and a second flange arranged at right angles thereto to form a continuation of the other flange of the cross connecting member.

HAROLD O. OTTERNESS.

REFERENCES CITED

The following references are of record in the file of this patent:

UNITED STATES PATENTS

| Number | Name | Date |
| --- | --- | --- |
| 1,101,883 | Rochford | June 30, 1914 |
| 1,299,512 | Seidel | Apr. 8, 1919 |
| 2,332,993 | Davis | Oct. 26, 1943 |
| 2,418,279 | Sax et al. | Apr. 1, 1947 |

FOREIGN PATENTS

| Number | Country | Date |
| --- | --- | --- |
| 313,311 | Germany | Oct. 2, 1918 |